United States Patent
Richardson

[11] Patent Number: 6,056,550
[45] Date of Patent: May 2, 2000

[54] EDUCATIONAL INTERACTIVE DEVICE

[76] Inventor: Rosalyn Gail Richardson, 511 E. 99th St. Apt. 201, Inglewood, Calif. 90301

[21] Appl. No.: 08/974,046

[22] Filed: Nov. 19, 1997

[51] Int. Cl.[7] ................................................ G09B 5/00
[52] U.S. Cl. ....................... 434/169; 434/308; 434/365; 446/142
[58] Field of Search ................................. 446/141, 142, 446/143, 302; 434/193, 202, 200, 169, 185, 236, 307 R, 308, 319, 322, 365, 393

[56] References Cited

U.S. PATENT DOCUMENTS

| | | | |
|---|---|---|---|
| 3,548,536 | 12/1970 | Glass et al. | 446/142 |
| 3,594,941 | 7/1971 | Handler et al. | 446/142 |
| 3,769,744 | 11/1973 | Sloane, Jr. et al. | 446/142 |
| 4,103,452 | 8/1978 | Wood | 446/142 |
| 4,104,821 | 8/1978 | Nakajima | 446/142 |
| 4,266,365 | 5/1981 | Cummings et al. | 446/142 |
| 4,959,017 | 9/1990 | Thompson et al. | 434/110 |
| 4,990,092 | 2/1991 | Cummings | 434/317 |
| 5,184,971 | 2/1993 | Williams | 446/142 |
| 5,290,190 | 3/1994 | McClanahan | 434/317 |
| 5,380,205 | 1/1995 | Bradley et al. | 434/317 |
| 5,382,188 | 1/1995 | Tomellini | 446/397 |
| 5,433,610 | 7/1995 | Godfrey et al. | 434/169 |
| 5,513,993 | 5/1996 | Lindley et al. | 434/319 |
| 5,554,031 | 9/1996 | Moir et al. | 434/111 |
| 5,609,508 | 3/1997 | Wingate | 446/142 |
| 5,679,049 | 10/1997 | Arad et al. | 446/142 |
| 5,681,170 | 10/1997 | Rieber et al. | 434/355 |
| 5,681,200 | 10/1997 | Shecter | 446/76 |

*Primary Examiner*—Joe H. Cheng

[57] ABSTRACT

An educational interaction device is provided with a housing having a handle and a phone handset. A numeric keypad representative of a telephone keypad is situated on the front face of the housing below the liquid crystal display. A plurality of lamps are situated on the front face of the housing for illuminating upon the actuation thereof. A tape player mechanism is situated within the interior space of the housing for playing back a plurality of audio and information signals. The tape player mechanism is connected to the speakers for transmitting the audio signals to the speakers. A speech synthesizer with associated memory means is connected to the speakers for emitting therefrom a plurality of audio signals representative of various instructions. A sound generation device is also connected to the speakers for emitting therefrom a plurality of audio signals representative of various sounds. Finally, control circuitry is adapted to transmit general instructions from the speaker via the speech synthesizer and further transmit specific instructions stored in a magnetic tape from the speakers via the tape player mechanism. The control means further is adapted to illuminate various combinations of the lamps and transmit various sounds from the speakers via the sound generation device as a function of the receipt of the depression of the keys of the keypad.

7 Claims, 2 Drawing Sheets

EDUCATIONAL INTERACTIVE DEVICE

BACKGROUND OF THE INVENTION

1. Field of the Invention

The present invention relates to interactive devices and more particularly pertains to a new Educational Interactive Device for teaching children procedures valuable in dangerous or emergency situations.

2. Description of the Prior Art

The use of interactive devices is known in the prior art. More specifically, interactive devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art interactive devices include U.S. Pat. No. 5,380,205; U.S. Pat. No. 5,433,610; U.S. Pat. No. 4,884,974; U.S. Pat. No. 4,021,932; U.S. Pat. No. 5,290,190; and U.S. Pat. No. 4,990,092.

In these respects, the Educational Interactive Device according to the present invention substantially departs from the conventional concepts and designs of the prior art, and in so doing provides an apparatus primarily developed for the purpose of teaching children procedures valuable in dangerous or emergency situations.

SUMMARY OF THE INVENTION

In view of the foregoing disadvantages inherent in the known types of interactive devices now present in the prior art, the present invention provides a new Educational Interactive Device construction wherein the same can be utilized for teaching children procedures valuable in dangerous or emergency situations.

The general purpose of the present invention, which will be described subsequently in greater detail, is to provide a new Educational Interactive Device apparatus and method which has many of the advantages of the interactive devices mentioned heretofore and many novel features that result in a new Educational Interactive Device which is not anticipated, rendered obvious, suggested, or even implied by any of the prior art interactive devices, either alone or in any combination thereof.

To attain this, the present invention generally comprises a housing with a rectangular configuration. As shown in FIGS. 1 & 2, the housing has a front face, a rear face, a top face, a bottom face, and a pair of side faces coupled therebetween defining an interior space. The housing further comprises an inverted U-shaped handle pivotally coupled to the top face thereof. For reasons that will become apparent later, a pair of prongs are integrally coupled to one of the side faces thereof and extending outwardly therefrom. Also included is a phone handset having a pair of circular portions with a handle coupled therebetween. A first speaker is situated within a top circular portion of the phone handset for emitting audible signals therefrom. The phone handset also has a coiled insulated wire coupled between a bottom circular portion of the handset and the housing. As shown in FIG. 1, a liquid crystal display is situated at a central extent of the front face of the housing adjacent the top face thereof. In use, the display is adapted for depicting a plurality of alphanumeric characters. Further provided is a numeric keypad representative of a telephone keypad. Such keypad is situated on the front face of the housing below the liquid crystal display. A second speaker is positioned on the front face of the housing for emitting audible signals therefrom at a volume greater than that of the first speaker. A plurality of lamps are situated on the front face of the housing for illuminating upon the actuation thereof. Associated therewith is a plurality of switches positioned on the front face of the housing. The switches are adapted for transmitting a corresponding unique signal upon the depression thereof. A tape player mechanism is situated within the interior space of the housing for playing back a plurality of audio and information signals stored on a magnetic tape or the like. The tape player mechanism has a plurality of buttons including a stop button, a fast forward button, a rewind button, and a play button. Such buttons facilitate the playback of the signals. As shown in FIG. 3, the tape player mechanism is connected to the speakers for transmitting the audio signals to the speakers. Further included is a speech synthesizer with associated memory means connected to the speakers, as shown in FIG. 3. The speech synthesizer is adapted for emitting therefrom a plurality of audio signals representative of various instructions. A sound generation device is connected to the speakers for emitting therefrom a plurality of audio signals representative of various sounds. Finally, control means is connected in communication with the display, keypad, lamps, switches, tape player mechanism, speech synthesizer, and sound generation device. Generally, the control means is adapted to transmit general instructions from the speaker via the speech synthesizer and further transmit specific instructions stored in a magnetic tape from the speakers via the tape player mechanism. After the general and specific instructions have been relayed to the user, the switches and keypad may be manipulated in an attempt to respond. The control means is then further adapted to illuminate various combinations of the lamps and transmit various sounds from the speakers via the sound generation device as function of the signals of the switches and the depression of the keys of the keypad.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new Educational Interactive Device apparatus and method which has many of the advantages of the interactive devices mentioned heretofore and many novel features that result in a new Educational Interactive Device which is not anticipated, rendered obvious, suggested, or even implied by any of the prior art interactive devices, either alone or in any combination thereof.

It is another object of the present invention to provide a new Educational Interactive Device which may be easily and efficiently manufactured and marketed.

It is a further object of the present invention to provide a new Educational Interactive Device which is of a durable and reliable construction.

An even further object of the present invention is to provide a new Educational Interactive Device which is susceptible of a low cost of manufacture with regard to both materials and labor, and which accordingly is then susceptible of low prices of sale to the consuming public, thereby making such Educational Interactive Device economically available to the buying public.

Still yet another object of the present invention is to provide a new Educational Interactive Device which provides in the apparatuses and methods of the prior art some of the advantages thereof, while simultaneously overcoming some of the disadvantages normally associated therewith.

Still another object of the present invention is to provide a new Educational Interactive Device for teaching children procedures valuable in dangerous or emergency situations.

Even still another object of the present invention is to provide a new Educational Interactive Device that includes a housing having a handle and a phone handset. A numeric keypad representative of a telephone keypad is situated on the front face of the housing below the liquid crystal display. A plurality of lamps are situated on the front face of the housing for illuminating upon the actuation thereof. A tape player mechanism is situated within the interior space of the housing for playing back a plurality of audio and information signals. The tape player mechanism is connected to the speakers for transmitting the audio signals to the speakers. A speech synthesizer with associated memory means is connected to the speakers for emitting therefrom a plurality of audio signals representative of various instructions. A sound generation device is also connected to the speakers for emitting therefrom a plurality of audio signals representative of various sounds. Finally, control circuitry is adapted to transmit general instructions from the speaker via the speech synthesizer and further transmit specific instructions stored in a magnetic tape from the speakers via the tape player mechanism. The control means further is adapted to illuminate various combinations of the lamps and transmit various sounds from the speakers via the sound generation device as a function of the receipt of the depression of the keys of the keypad.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
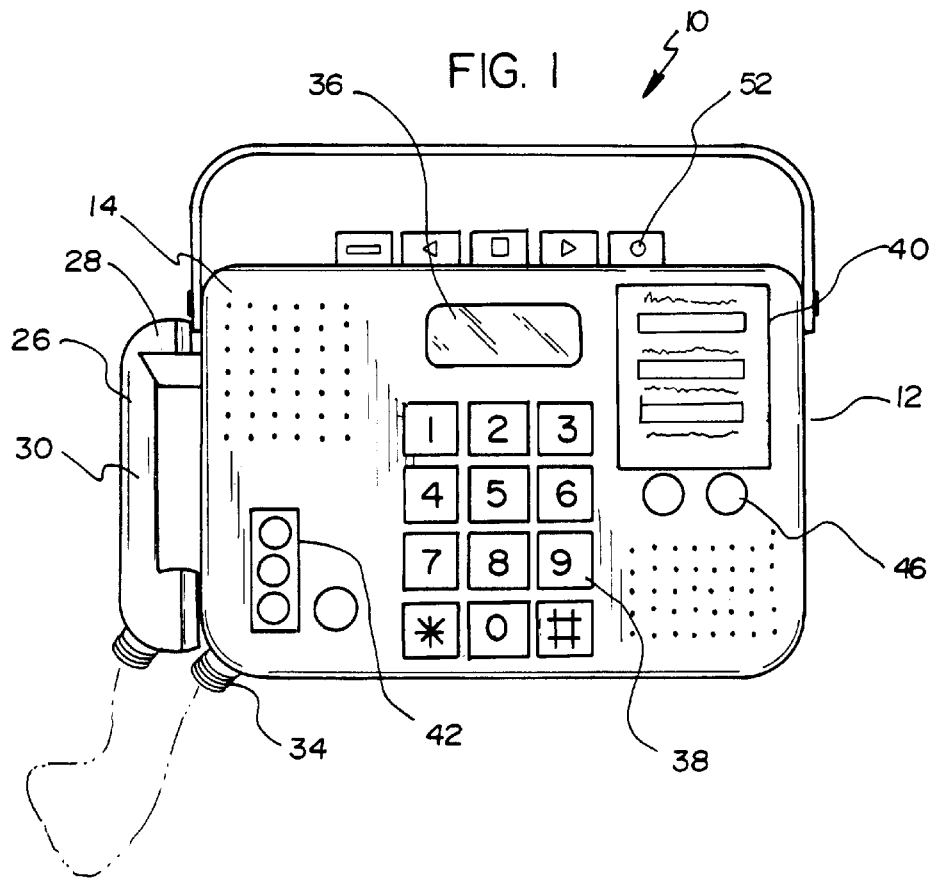
FIG. 1 is a front view of a new Educational Interactive Device according to the present invention.

With reference now to the drawings, a new Educational Interactive Device embodying the principles and concepts of the present invention and generally designated by the reference numeral 10 will be described.

Figure 2:
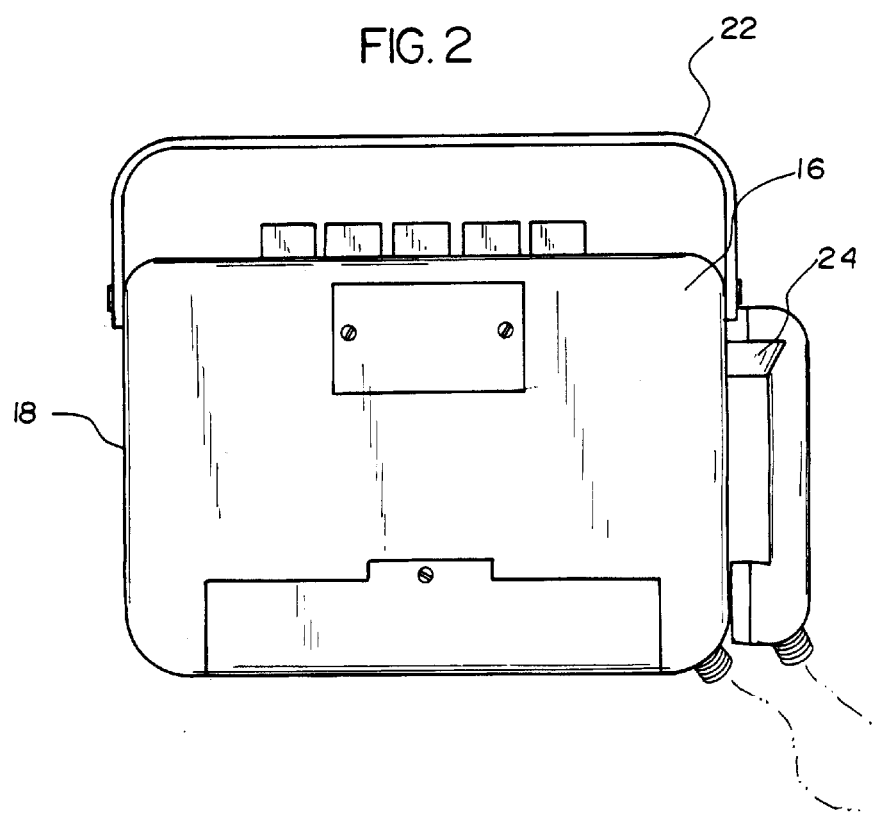
FIG. 2 is a rear view of the present invention.

Specifically, the system 10 of the present invention includes a portable housing 12 with a rectangular configuration. As shown in FIGS. 1 & 2, the housing has a front face 14, a rear face 16, a top face, a bottom face, and a pair of side faces 18 coupled therebetween defining an interior space. The housing further comprises an inverted U-shaped handle 22 pivotally coupled to the top face thereof. For reasons that will become apparent later, a pair of prongs 24 are integrally coupled to one of the side faces of the housing and extends outwardly therefrom.

Also included is a phone handset 26 having a pair of circular portions 28 with a handle 30 coupled therebetween. A first speaker 32 is situated within a top circular portion of the phone handset for emitting audible signals therefrom. The speaker may be equipped with an amplification network to facilitate the transmission of the audio signals. The phone handset also has a coiled insulated wire 34 coupled between a bottom circular portion of the handset and the housing.

As shown in FIG. 1, a liquid crystal display 36 is situated at a central extent of the front face of the housing adjacent the top face thereof. In use, the display is adapted for depicting a plurality of alphanumeric characters and graphics.

Further provided is a numeric keypad 38 representative of a telephone keypad. As such, the numeric keypad has a square configuration and includes explicit "*" and "#" keys. The keypad is situated on the front face of the housing below the liquid crystal display.

Positioned adjacent the keypad is a plurality of numbers 40 printed on the front face each with an emergency indicia positioned adjacent thereto. It should be apparent that the printed numbers are representative of a plurality of emergency phone numbers.

A second speaker is positioned on the front face of the housing for emitting audible signals therefrom at a volume greater than that of the first speaker. It should be noted that the first and second speaker are represented by a single indicia in FIG. 3.

A plurality of lamps 42 are situated on the front face of the housing for illuminating upon the actuation thereof. To allow the actuation of only a certain one or group of lamps, a demultiplexer 44 is connected thereto.

Associated therewith is a plurality of switches 46 positioned on the front face of the housing. The switches are adapted for transmitting a corresponding unique signal upon the depression thereof. The switches include at least a "YES" button and a "NO" button. Associated with the switches is an encoder 48 for providing the unique signal upon the depression thereof.

Figure 3:
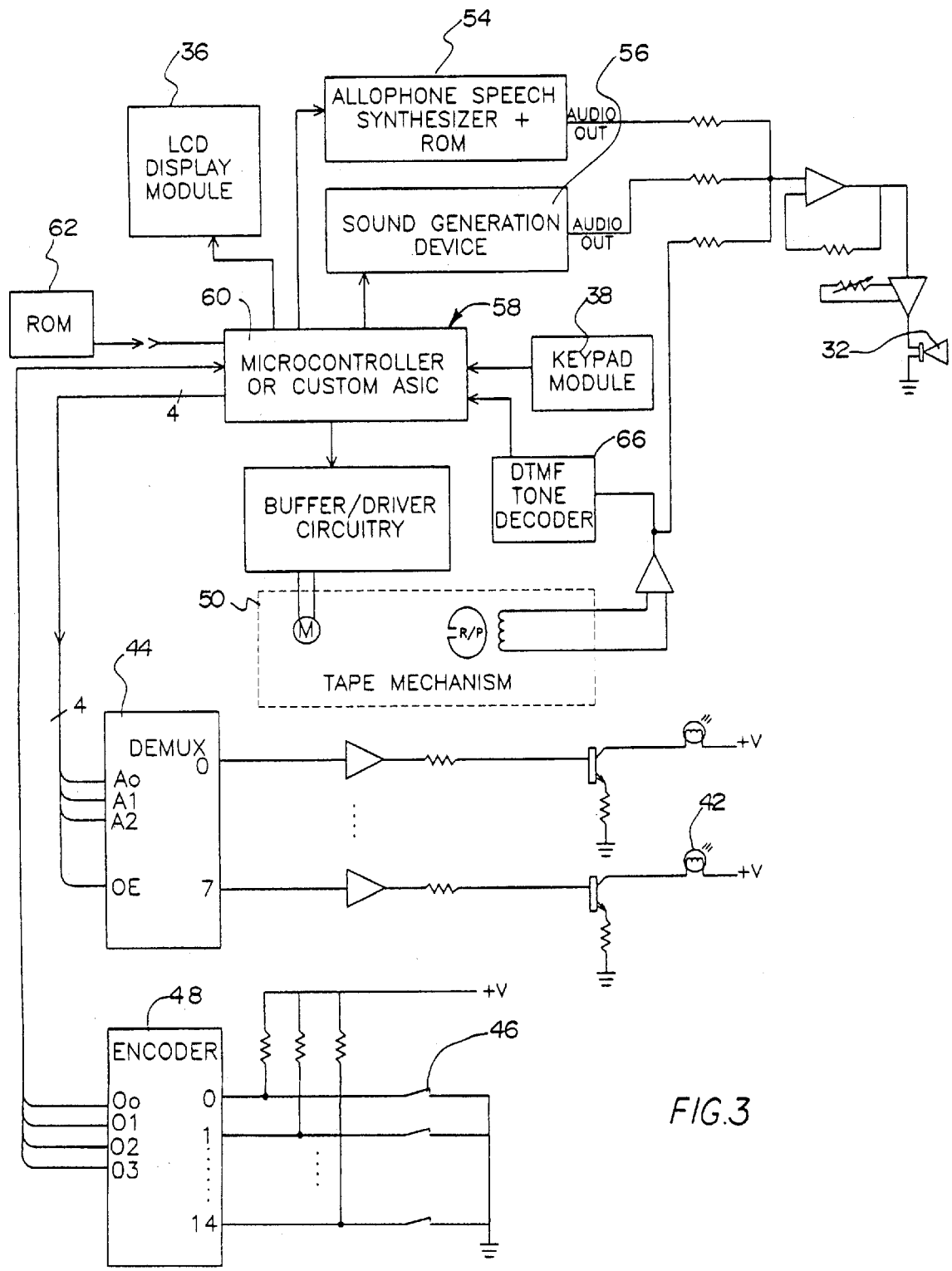
FIG. 3 is a schematic diagram of the electrical components of the present invention.

A tape player mechanism 50 is situated within the interior space of the housing for playing back a plurality of audio and information signals stored on a magnetic tape or the like. The tape player mechanism has a plurality of buttons 52 including a stop button, a fast forward button, a rewind button, and a play button. Such buttons facilitate the playback of the signals. As shown in FIG. 3, the tape player mechanism is connected to the speakers for transmitting the audio signals to the speakers.

Further included is a speech synthesizer 54 with associated memory means connected to the speakers, as shown in FIG. 3. The speech synthesizer is adapted for emitting therefrom a plurality of audio signals representative of various instructions. Such audio signals are stored in the associated memory means which takes the form of read only memory.

A sound generation device 56 is connected to the speakers for emitting therefrom a plurality of audio signals representative of various sounds. Examples of sounds which are generated by the present device are a siren, telephone ring, and applause.

Finally, control means 58 is connected in communication with the display, keypad, demultiplexer of the lamps, encoder of the switches, tape player mechanism, speech synthesizer, and sound generation device. The control means basically comprises a microcontroller 60 or an application specific integrated circuit in combination with read only memory 62. Generally, the control means is adapted to transmit general instructions from the speaker via the speech synthesizer. Such general instructions are those which do not pertain to any specific application or use of the present invention, but rather facilitates the general use thereof. For example, one of the sets of general instructions includes a menu. The control means is also adapted transmit specific instructions stored in a magnetic tape from the speakers via the tape player mechanism. After the general and specific instructions have been relayed to the user, the switches and keypad may be manipulated in an attempt to respond correctly. The control means is then further adapted to illuminate various combinations of the lamps and transmit various sounds from the speakers via the sound generation device as function of the signals received from the switches and the depression of the keys of the keypad. Such function that governs the operation is dictated by the information signals received from the tape player mechanism. It should be noted that the information signals are translated into usable form by way of a DTMF decoder 66. In order to prevent the information signals from reaching the speaker, a common filter or a feedback mechanism may be employed. The function of the control means of the present invention thus provides an interactive device designed to ask children questions and guide them through basic procedures which may be employed in a dangerous or emergency situation.

For example, in a first use of the present invention wherein an associated magnetic tape is placed within the tape playback mechanism, the child is taught how to dial an emergency number. Upon beginning after the general instructions, the child is prompted by the speakers to pick upon the phone and dial a certain number from the printed list. If the child dials the number correctly via the keypad, a siren is emitted from the speakers and the lamps are adapted to be intermittently actuated, thereby indicating to the child that he or she has been successful. In addition, pictures may be depicted on the display for reinforcing the same.

In yet another example of use, a question is emitted from the speakers and the child is requested to respond by way of depressing one of the switches. Similar to the previous example, feedback is given via the display, speakers, and lamps.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An educational interaction device including:

a housing with a rectangular configuration having a front face, a rear face, a top face, a bottom face, and a pair of side faces coupled therebetween defining an interior space, the housing having an inverted U-shaped handle pivotally coupled to the top face thereof and a pair of prongs integrally coupled to one of the side faces thereof and extending outwardly therefrom;

a phone handset having a pair of circular portions with a handle coupled therebetween with a first speaker situated within a top circular portion fur emitting audible signals therefrom, the phone handset having a coiled insulated wire coupled between a bottom circular portion of the handset and the housing;

a liquid crystal display situated at a central extent of the front face of the housing adjacent the top face thereof for displaying a plurality of alphanumeric characters;

a numeric keypad representative of a telephone keypad situated on the front face of the housing below the liquid crystal display;

a second speaker positioned on the front face of the housing for emitting audible signals therefrom;

a plurality of lamps situated on the front face of the housing for illuminating upon the actuation thereof;

a plurality of switches positioned on the front face of the housing for transmitting a corresponding unique signal upon the depression thereof;

a tape player mechanism situated within the interior space of the housing for playing back a plurality of audio and information signals recorded on cassette tapes removably insertable in the tape player mechanism such that prerecorded audio and information signals can be readily provided via the tape player mechanism, the tape player mechanism further having a plurality of buttons for controlling the tape player mechanism, the plurality of buttons including a stop button, a fast forward button, a rewind button, and a play button, the tape player mechanism connected to the speakers for transmitting the audio signals to the speakers;

a speech synthesizer with associated memory means connected to the speakers for emitting therefrom a plurality of audio signals representative of various instructions;

a sound generation device connected to the speakers for emitting therefrom a plurality of audio signals representative of various sounds; and control means in communication with the display, keypad, lamps, switches, tape player mechanism, speech synthesizer, and sound generation device, the control means adapted to transmit general instructions from the speaker via the speech synthesizer and further transmit specific instructions stored in a cassette tape from the speakers via the tape player mechanism, the control means further adapted to illuminate various combinations of the lamps and transmit various sounds from the speakers via the sound generation device as a function of the receipt of the signals received from the switches and the depression of keys of the keypad.

2. An educational interaction device including:

a housing having a front face, a rear face, a top face, a bottom face, and a pair of side faces coupled therebetween defining an interior space;

a phone having a cord coupled thereto and further connected to the housing;

a numeric keypad representative of a telephone keypad situated on the front face of the housing;

a speaker for remitting audible signals therefrom;

a tape player mechanism located in the interior space of the housing for playing back a plurality of audio and information signals recorded on cassette tapes removably insertable in the tape player mechanism such that prerecorded audio and information signals can be readily provided via the tape player mechanism, the tape player mechanism further having a plurality of buttons for controlling the tape player mechanism, the plurality of buttons including a stop button, a fast forward button, a rewind button, and a play button, the tape player mechanism being connected to the speaker for transmitting the audio signals to the speaker;

sound generation means with associated memory means connected to the speaker for emitting therefrom a plurality of audio signals representative of various instructions and sounds; and a controller in communication with the keypad, tape player mechanism and the sound generation means, the controller adapted to transmit general instructions from the speaker via the sound generation means, the controller further adapted to transmit various sounds from the speaker via the sound generation means as a function of the depression of keys of the keypad.

3. The educational interaction device as set forth in claim 2 and further including a plurality of lamps, wherein the controller is further adapted to illuminate the lamps as a function of the depression of keys of the keypad.

4. The educational interaction device as set forth in claim 2 wherein the housing has a handle coupled to the top face thereof.

5. The educational interaction device as set forth in claim 2 wherein indicia indicative of phone numbers is positioned on the housing.

6. The educational interaction device as set forth in claim 2 wherein the controller generates audio signals upon the successful depression of a sequence of the keys of the keypad indicated by the instructions.

7. An educational interaction device including:

a housing having a front face, a rear face, a top face, a bottom face, and a pair of side faces coupled therebetween defining an interior space, the housing having a handle coupled to the top face thereof;

a phone handset having a pair of portions with a handle coupled therebetween, the phone handset having a cord coupled between a bottom portion of the handset and the housing;

a numeric keypad representative of the telephone keypad situated on the front face of the housing;

a speaker positioned on the front face of the housing for emitting audible signals therefrom;

a plurality of lamps situated on the front face of the housing for illuminating upon the actuation thereof;

a plurality of switches positioned on the front face of the housing for transmitting a corresponding unique signal upon the depression thereof;

a speech synthesizer with associated memory mean connected to the speakers for emitting therefrom a plurality of audio signals representative of various instructions;

a tape player mechanism located in the interior space of the housing for playing back a plurality of audio and information signals recorded on cassette tapes removably insertable in the tape player mechanism such that prerecorded audio and information signals can be readily provided via the tape player mechanism, the tape player mechanism further having a plurality of buttons for controlling the tape player mechanism, the plurality of buttons including a stop button, a fast forward button, a rewind button, and a play button, the tape player mechanism being connected to the speaker for transmitting the audio signals to the speaker;

a sound generation device connected to the speaker for emitting therefrom a plurality of audio signals representative of various sounds; and a control means in communication with the keypad, lamps, switches, speech synthesizer, tape player mechanism and sound generation device, the control means adapted to transmit general instructions from the speaker via the speech synthesizer, the control means further adapted to illuminate various combinations of the lamps and transmit various sounds from the speakers via the sound generation device as a function of the receipt of the signals received from the switches and the depression of keys of the keypad.

* * * * *